US008453383B2

(12) United States Patent
Barr et al.

(10) Patent No.: US 8,453,383 B2
(45) Date of Patent: Jun. 4, 2013

(54) ADJUSTABLE GLASS CLAMP FOR CABLE DRIVE WINDOW REGULATORS

(75) Inventors: Geoffrey Barr, Troy, MI (US); Kristopher M. Flowers, Troy, MI (US)

(73) Assignee: Inteva Products, LLC, Troy, MI (US)

( * ) Notice: Subject to any disclaimer, the term of this patent is extended or adjusted under 35 U.S.C. 154(b) by 724 days.

(21) Appl. No.: 12/544,885

(22) Filed: Aug. 20, 2009

(65) Prior Publication Data

US 2010/0043297 A1 Feb. 25, 2010

Related U.S. Application Data

(60) Provisional application No. 61/090,483, filed on Aug. 20, 2008.

(51) Int. Cl.
*B60J 1/16* (2006.01)

(52) U.S. Cl.
USPC .................. 49/374; 49/375; 49/372; 49/348; 49/349

(58) Field of Classification Search
USPC .................. 49/374, 375, 348, 352, 349, 372, 49/324, 502
See application file for complete search history.

(56) References Cited

U.S. PATENT DOCUMENTS

| | | | | |
|---|---|---|---|---|
| 4,648,208 A | | 3/1987 | Baldamus et al. | |
| 4,762,904 A | * | 8/1988 | Nakama | 428/122 |
| 5,363,595 A | * | 11/1994 | Wirsing | 49/375 |
| 5,537,783 A | * | 7/1996 | Kazino et al. | 49/375 |
| 5,692,273 A | | 12/1997 | Rodde | |
| 5,729,930 A | * | 3/1998 | Schust et al. | 49/375 |
| 5,765,310 A | * | 6/1998 | Gold | 49/375 |
| 5,946,860 A | | 9/1999 | Weber et al. | |
| 5,960,588 A | | 10/1999 | Wurm et al. | |
| 6,050,560 A | * | 4/2000 | Schuetteler | 269/234 |
| 6,119,403 A | | 9/2000 | Klippert et al. | |
| 6,166,508 A | | 12/2000 | Kalb | |
| 6,236,176 B1 | | 5/2001 | Uebelein et al. | |
| 6,425,204 B1 | | 7/2002 | Renner | |
| 6,453,617 B1 | | 9/2002 | Klippert et al. | |
| 6,588,152 B2 | * | 7/2003 | Cabbane | 49/375 |
| 6,854,213 B2 | * | 2/2005 | Galliani | 49/375 |
| 7,062,880 B2 | | 6/2006 | Renke et al. | |
| 2003/0093960 A1 | * | 5/2003 | Mizusawa et al. | 52/204.62 |
| 2006/0010775 A1 | * | 1/2006 | Tao et al. | 49/375 |
| 2006/0130407 A1 | * | 6/2006 | Castellon | 49/375 |

* cited by examiner

*Primary Examiner* — Katherine Mitchell
*Assistant Examiner* — Marcus Menezes
(74) *Attorney, Agent, or Firm* — Cantor Colburn LLP

(57) ABSTRACT

A window clip for connecting a window to a window lift includes a clip body having a generally U-shaped profile and a window lift connector attached to the clip body. The clip body includes a pair of generally opposed side walls connected at a closed bottom portion with an opening opposite therefrom, each opposed side wall having an inner face and having a single concave curvilinear surface on the inner face. An isolator is adapted to fit into a clip body. The isolator has a convex curvilinear portions adapted to fit and nest within the concave curvilinear surfaces on each inner face.

17 Claims, 4 Drawing Sheets

ADJUSTABLE GLASS CLAMP FOR CABLE DRIVE WINDOW REGULATORS

CROSS REFERENCE TO RELATED APPLICATIONS

This application claims priority to U.S. Provisional Application Ser. No. 61/090,483, filed Aug. 20, 2008, the contents of which are incorporated by reference herein.

BACKGROUND OF THE INVENTION

Window actuators, such as those for automobile window assemblies, are well-known. Today's window actuators typically utilize devices, known in the art as regulators, to both lower and lift glass window pane between a lower open position and an upper closed position. The window regulators typically use elongated spaced apart guide rails upon which a window pane rides. In practice, the window regulator is typically disposed within an automobile door, liftgate etc.

In many window regulator and door assemblies, the window pane travels along the guide rails in the path defined by vertical window frames and a horizontal upper header. The header and window frames aid in aligning and supporting the window pane within the door, when the window and door assembly is being built. In other types of window assemblies, such as lift gates or windows in automobiles having convertible roofs, known in the art as "headerless" assemblies, the window pane does not travel in the path defined by window frame or a header, because there is no frame or header around the periphery of the glass.

When the door is open and the window pane is in an up position, a person may push on the window pane to close the door or liftgate. Most prior art headerless assemblies, do not provide stiffness to the window pane. This causes the window pane to move or deflect laterally when a person pushes on the window pane. The excessive lateral deflection by the window pane does not provide the rigidity desired by most people.

Furthermore, today's convertible tops have been designed to resist water infiltration at the junction of the window in the roofline. This new design incorporates a roof edge, which extends beyond and depends below the top edge of the window in its uppermost closed position. This design keeps water from running between the seal on the roof and the top edge of the window. Thus, water never has a chance to seep between the seal by either adhesion or a poor seal. This design also presents a unique challenge. Upon opening a door, the window pane must automatically retract some distance below its uppermost closed position in order that it does not collide with the roofline of the automobile.

In the design of the cable drive regulator for frameless automotive moving windows, it is normal practice to provide glass adjustment in the inboard/outboard and fore and aft directions. Normally, this can be achieved by adjustment of the guide rails, and by the use of a glass clamp. Indeed, glass rotational adjustment can be made by either a wedge or a steel stamping prior to clamping the glass in place.

SUMMARY OF THE INVENTION

The present invention is an improvement over the prior art in that the novel window clamp disclosed herein makes the installation and adjustment of a window more user friendly. By controlling the glass better after adjustment, the present system assures that the glass stays in specification after installation.

According to one aspect of the invention, a one-piece molded window clamp of the present invention comprises a clip body having a generally U-shaped profile. A window lift connector is attached to the clip body. The body includes a pair of generally opposed side walls connected at a closed bottom portion. An opening, opposite the closed bottom portion, receives an edge of the window. Each of the opposed side walls has an inner face opposite the other and which includes a single concave curvilinear surface on the inner face. An isolator is adapted to fit into the clip body. It includes a convex curvilinear portion adapted to fit within the concave curvilinear surface of the inner face.

According to another aspect of the invention, a window clip is incorporated into a window lift mechanism. The window lift includes a window lift actuator, along with the window clip for attaching to a window. The window cable is interposed between the actuator and the window clip for actuating the window clip between first and second positions along a window rail. The window clip further includes a clip body having a generally U-shaped profile and a window lift connector interposed between the clip body and the window rails. The clip body includes a pair of generally opposed side walls connected at a closed bottom portion with an opening for receiving the window opposite therefrom. Each of the opposed side walls has an inner face opposite each other and has a single concave curvilinear surface on the inner face connecting the sidewalls. An isolator is adapted to fit into the clip body, the isolator having a convex curvilinear portion adapted to fit within the concave curvilinear surface on the inner face.

According to yet another aspect of the invention, a method of assembling a window lift mechanism is provided. The method includes providing a window lift actuator in the window. Window clips are each provided with an isolator having a convex curvilinear portion that is adapted to fit within the concave curvilinear surface of an inner face. The isolator is inserted into the clip body, and the window is inserted into the clip and against the isolator. The window is placed into its final position relative to the clamp and the window is secured to the window clamp.

These and other advantages and features will become more apparent from the following description taken in conjunction with the drawings.

BRIEF DESCRIPTION OF THE DRAWINGS

Other features, advantages and details appear, by way of example only, in the following description of embodiments, the description referring to the drawings in which.

DETAILED DESCRIPTION OF THE INVENTION

Figure 1:
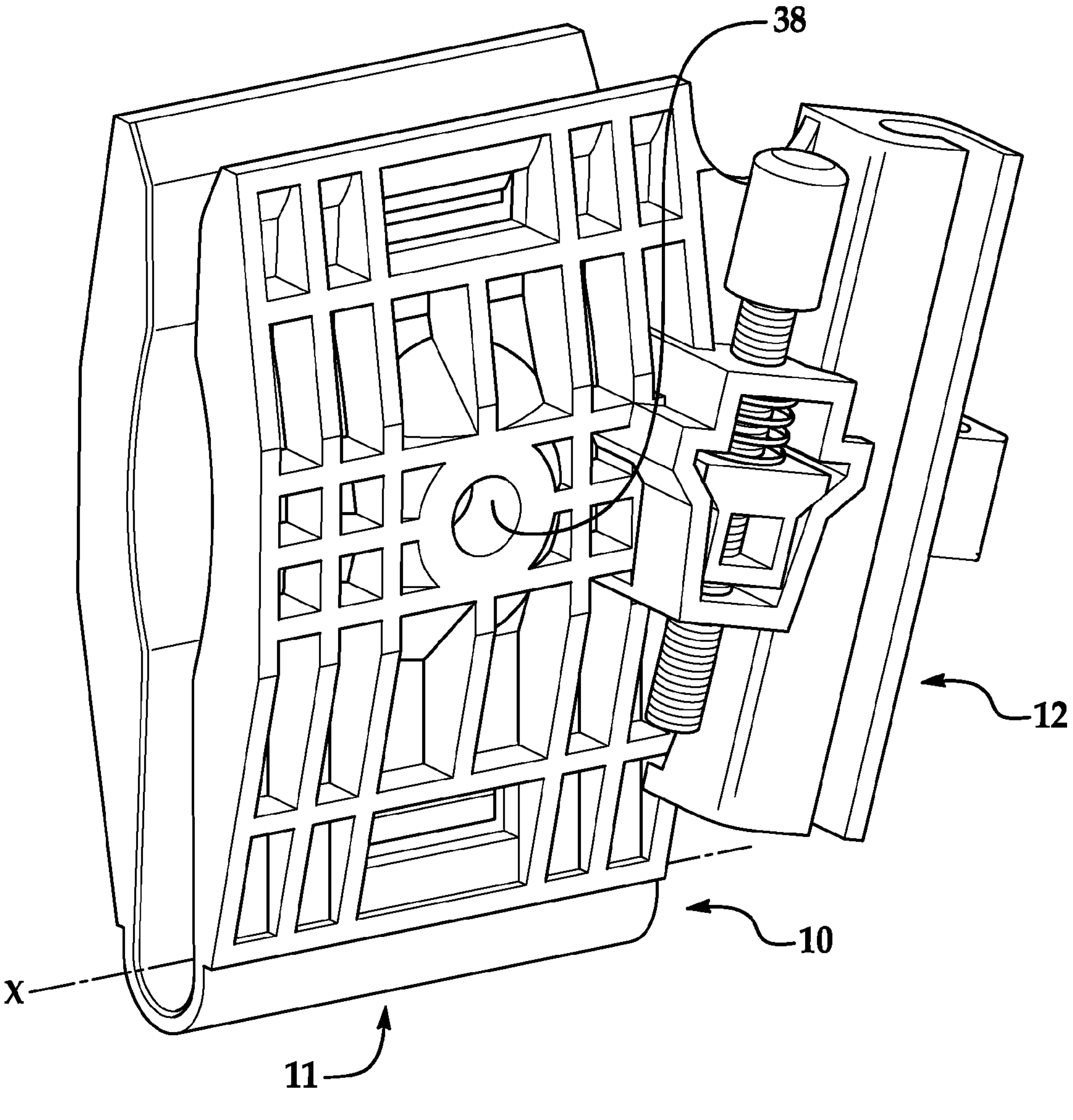
FIG. 1 shows a front orthogonal view of a window clip in accordance with the present invention.
Figure 2:
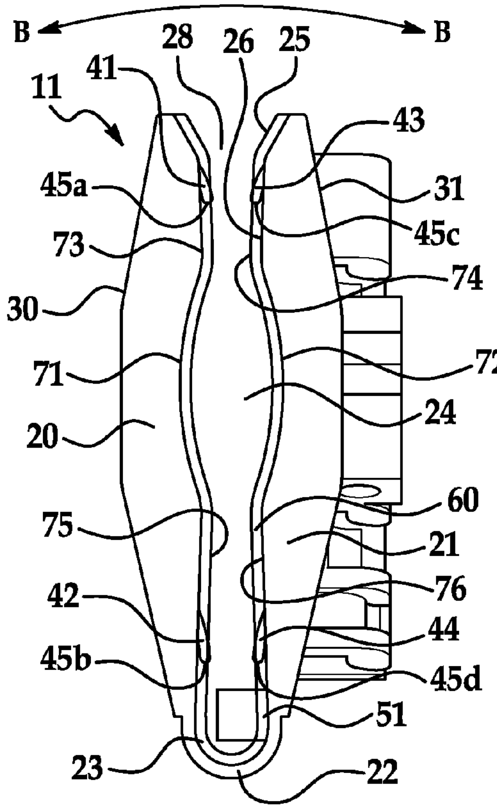
FIG. 2 shows a side view of a clip body in accordance with the present invention.
Figure 3:
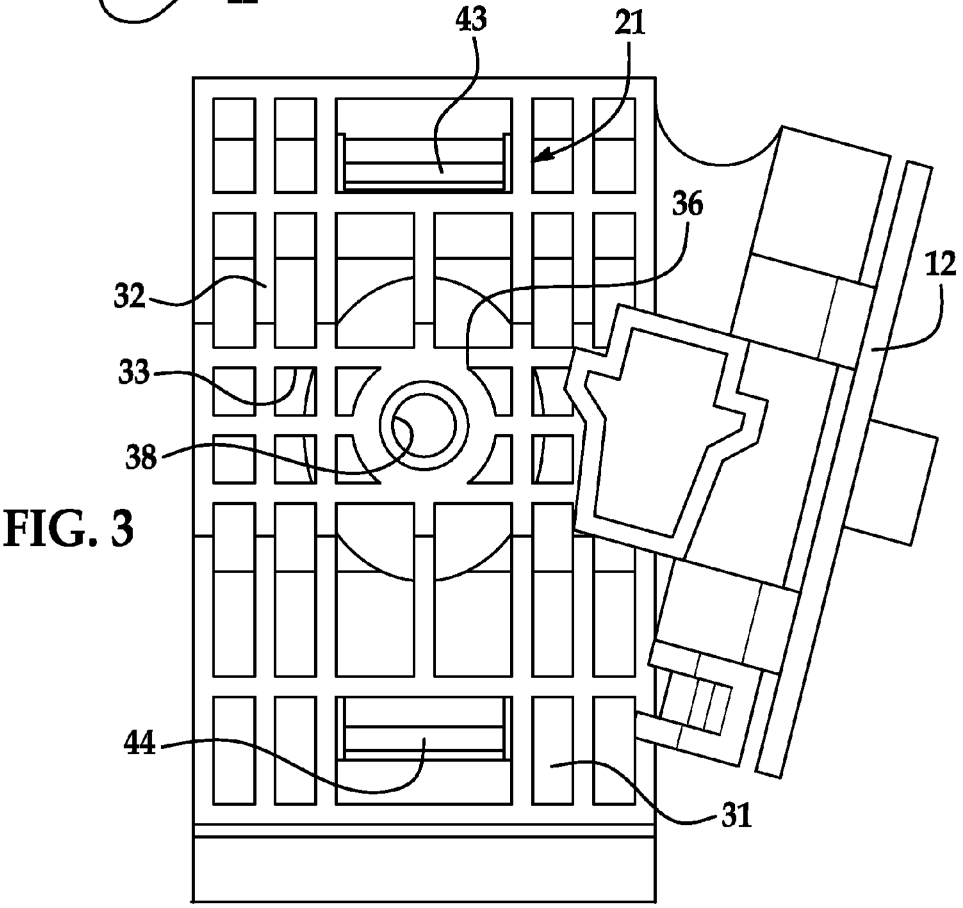
FIG. 3 shows a front view of a clip body in accordance with the present invention.

Referring now to the Figures, where the invention has been described with reference to the specific embodiments, without limiting same, a window clip 10 for connecting a window to a window lift system is shown in FIGS. 1-3. Window clip 10 is comprised of a clip body 11 and a window lift connector 12, which attaches to rails 13 of a window lift system 14.

Window clip body 11 includes a pair of generally opposed side walls 20 and 21. Side walls 20 and 21 are connected at a closed bottom portion wall 22 which forms a generally U-shaped channel 23 in an interior 24 of clip body 11, opposite and opening 28. Each of the side walls 20 and 21 include an interior surface 25 and 26, respectively, and an exterior surface 30 and 31, respectively. Extending outwardly from exterior surfaces 30 and 31 are a plurality of longitudinal and transverse ribs 32 and 33, respectively. Ribs 32 and 33 co-act to stiffen side walls 20 and 21 for purposes that will be described hereinafter. In the exemplary embodiment shown, clip body 11 is constructed of a structurally reinforced plastic material that is capable of elastically deforming to accept a window, as will be described hereinafter. The reinforced plastic material allows clip body 11 to be formed or molded as a single one piece element, while still allowing clip body 11 to be capable of elastic deformation. Prior die cast window clips were comprised of at least two pieces.

Located generally in the center region of the exterior surface 30 and 31 are annular openings 35 and 36. Openings 35 and 36 are defined by interior annular sidewalls 37 and 38. After final assembly of window clip 10 to a window, a shoulder bolt or other fastener (not shown) is placed through openings 35 and 36, and through a hole in the window (also not shown). A nut tightened onto the bolt will draw sidewalls 20 and 21 together to retain the window within clip 10. In this position, clip can ride on rails 13 of window system 14 in a manner well-known to one skilled in the art. A series of longitudinal and transverse ribs 32 and 33 created an extremely rigid clip 10 that provides a quality feel to a frameless window.

Extending from interior surfaces 25 and 26 and into the interior region 24 of clip body 11 are a series of retaining fingers 41, 42, 43 and 44. As shown, retaining fingers 41, 42, 43, and 44, are outwardly extending tabs having a leading edge, 45*a*, 45*b*, 45*c* and 45*d*. The leading edges 45*a*-45*d* are capable of elastic deflection. Thus, when the window is inserted in clip 10, fingers 41-44 provide additional bearing surfaces co-acting with the glass so that when sidewalls 20 and 21 are bolted together, a rigid connection is made between the glass and clamp 10. Finally, located adjacent to closed bottom wall 22 and within U-shaped channel 23, are two stop ribs 51. Each stop rib 51 co-acts with the bottom edge of a window in order that the window not sit directly adjacent to bottom wall 22. Though not shown, it will be appreciated that generally two stop ribs are used at opposite transverse ends of channel 23, as shown along the X-axis of FIG. 1.

Figure 4:
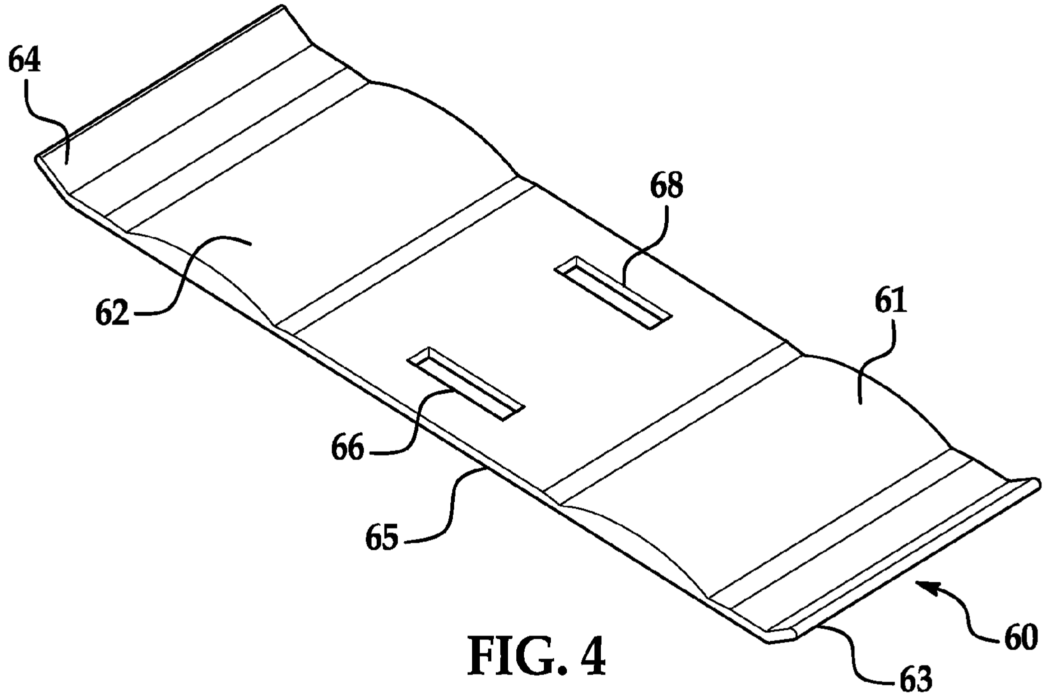
FIG. 4 is an orthogonal view of an isolator in accordance with the present invention.
Figure 5:
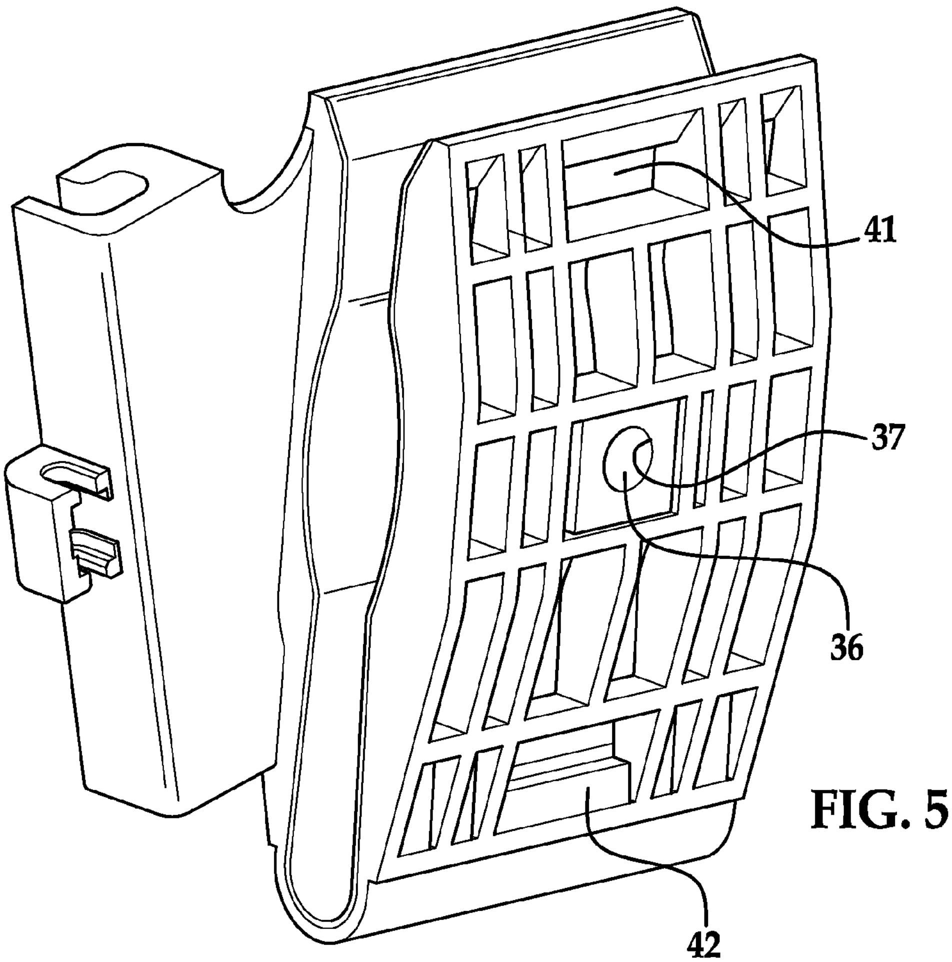
FIG. 5 is rear orthogonal view of a window clip of a present invention.

FIG. 4 shows isolator 60 adapted to fit within interior region 24 of clip body 11. In the exemplary embodiment shown, isolator 60 is made of a soft creep resistant engineered composite and is a resilient material that is different from the material of clip body 10. However, isolator 60 may be comprised of any material that provides a frictional surface against the glass, and may also be made of two or more materials to allow friction against the glass and adjustment movement within the clip body. Isolator 60 includes convex curvilinear portions 61 and 62 and diverging edge portion 63 and 64. Extending between curvilinear portions 61 and 62 is bottom cup portion 65. Cup portion 65 includes slots 66 and 68 which receive each of stop ribs 51 in order that stop ribs 51 extend through isolator 60 and into interior region 24.

Isolator 60 can be folded transversely within interior region 24 and inserted into interior region 24 of clip body 11. When in place, and as shown in FIG. 2, curvilinear portions 61 and 62 rest within curvilinear portions 71 and 72 formed on the interior surfaces 25 and 26 of sidewalls 20 and 21, respectively. It will be appreciated that curvilinear portions 71 and 72 generally mate with and are the mirror images of convex curvilinear portions 61 and 62. It will be appreciated that the additional resilient material provided by convex curvilinear portions 61 and 62 facilitate movement of glass within clip 10 rotationally as shown along arc B-B of FIG. 2, as is generally required to position a window in a frameless window system. The constant radius of clip 10 and mating isolator 60 allows the glass to rotate along arc B-B to match the assembly fixture of the frameless window assembly 14. It will be appreciated that the glass rotating in arc B-B is pivoting generally about an axis that is parallel to X-axis of FIG. 1, but generally adjacent to stop ribs 51.

To further facilitate pivoting of glass, interior faces 25 and 26 at an open end region 73 and 74 diverge as they extend from curvilinear portions 71 and 72 toward opening 28. In a like manner, interior faces 25 and 26 at a closed end region 75 and 76 diverge as they extend from curvilinear portions 71 and 72 toward channel 23.

Once the shoulder bolt is tightened, window glass is robustly held in a rigid position. The glass is held by a number of forces co-acting together, including one or more of the clamping force of the bolt, a specific coefficient of friction provided by the isolator 60 contacting the glass, and retaining fingers 41 through 44 elastically bearing against isolator 60, which then translates that force to the glass.

Figure 6:
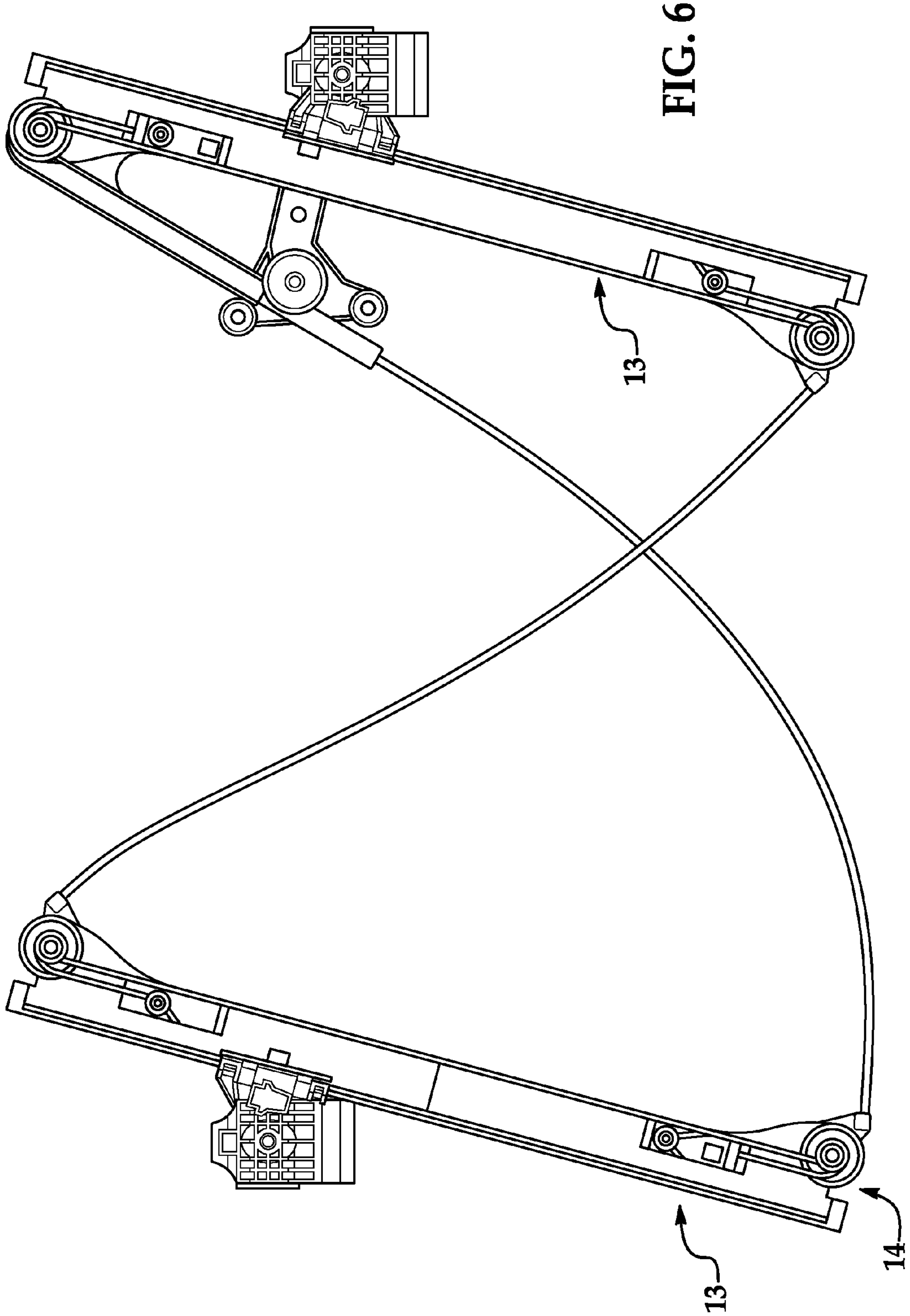
FIG. 6 shows a window lift assembly, utilizing a window clip of the present invention.

As shown in FIG. 6, window system 14 includes two window clips 10 attached to a window (not shown), but as is known to one skilled in the art. Window clips are capable of movement from a lower open window position to an upper closed window position and through multiple intermediate positions therebetween. The window can be retracted to an intermediate position can automatically, for instance, retracting the frameless window system slightly upon opening a car door having an overhanging convertible top roof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A window clip for connecting a window to a window lift, said window clip comprising:

a unitary clip body having a generally U-shaped profile and a window lift connector attached to said clip body, said clip body including a pair of generally opposed side walls connected at a closed bottom portion and an opening opposite said closed bottom portion for receiving said window, each one of said pair of generally opposed side walls having an inner face in a facing spaced relationship with respect to each other and having a single concave curvilinear surface on said inner face; and an isolator adapted to fit into said clip body, said isolator having a convex curvilinear portion mating in direct contact with said concave curvilinear surface on said inner face, wherein said isolator is a single sheet of resilient material having two convex curvilinear portions extending from a first surface of said sheet.

2. The window clip of claim 1, wherein each of said inner faces opposite each other have only a single concave curvilinear surface.

3. The window clip of claim 1, wherein said isolator is comprised of a resilient material that is deformable under pressure contact.

4. The window clip of claim 1, wherein at least one rib extends from said closed bottom portion and towards said opening.

5. The window clip of claim 4, wherein said isolator includes at least one opening therein, said rib extending therethrough.

6. The window clip of claim 1, wherein, each said inner face extends from said curvilinear portion to said closed bottom portion at a diverging angle from said curvilinear portion.

7. The window clip of claim 1, wherein each said inner face extends from said curvilinear portion to said opening at a diverging angle from said curvilinear portion.

8. The window clip of claim 1, wherein at least one of said opposed side walls includes at least one finger extending from said inner face of said side wall.

9. The window clip of claim 1, wherein said at least one of said opposed side walls includes at least two fingers extending from said inner face, one of said at least two fingers being located between said concave curvilinear surface and said opening, another of said at least two fingers being located between said concave curvilinear surface and said closed bottom portion.

10. The window dip of claim 9, wherein each of said opposed side walls includes at least two fingers.

11. The window dip of claim 1, wherein said clip body is a reinforced plastic element.

12. A window lift mechanism comprising:

a window lift actuator;

a window clip for attaching to a window;

a window cable interposed between said actuator and said window clip for actuating the window clip between first and second positions, said window clip further including a unitary clip body having a generally U-shaped profile and a window lift connector attached to said clip body, said clip body including a pair of generally opposed side walls connected at a closed bottom portion with an opening for receiving said window opposite therefrom, each of said opposed side walls having an inner face in a facing spaced relationship with respect to each other and having a single concave curvilinear surface on said inner face; and an isolator adapted to fit into said clip body, said isolator having a convex curvilinear portion mating in direct contact with said concave curvilinear surface on said inner face, wherein said isolator is a single sheet of resilient material having two convex curvilinear portions extending from a first surface of said sheet.

13. The window lift mechanism of claim 12, wherein each of said inner faces opposite each other have only a single concave curvilinear surface.

14. The window lift mechanism of claim 12, wherein said clip body is a reinforced plastic element.

15. The window lift mechanism as in claim 12, wherein at least one of said opposed side walls includes at least one finger extending from said inner face of said side wall.

16. The window lift mechanism as in claim 13, wherein said at least one of said opposed side walls includes at least two fingers extending from said inner face, one of said at least two fingers being located between said concave curvilinear surface and said opening, another of said at least two fingers being located between said concave curvilinear surface and said closed bottom portion.

17. The window lift mechanism as in claim 16, wherein each of said opposed side walls includes at least two fingers.

* * * * *